(12) United States Patent
Fuhrer et al.

(10) Patent No.: US 8,050,832 B2
(45) Date of Patent: Nov. 1, 2011

(54) METHOD FOR DETERMINING THE ROTATIONAL SPEED OF THE MAIN SHAFT OF A TRANSMISSION, AND TRANSMISSION COMPRISING A DEVICE FOR DETECTING ROTATIONAL SPEED

(75) Inventors: Kim Fuhrer, Lindau (DE); Thomas Puth, Friedrichshafen (DE); Frank Gessler, Grünkraut (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 581 days.

(21) Appl. No.: 12/300,868

(22) PCT Filed: Apr. 25, 2007

(86) PCT No.: PCT/EP2007/054017
§ 371 (c)(1),
(2), (4) Date: Nov. 14, 2008

(87) PCT Pub. No.: WO2007/134933
PCT Pub. Date: Nov. 29, 2007

(65) Prior Publication Data
US 2009/0280948 A1    Nov. 12, 2009

(30) Foreign Application Priority Data
May 19, 2006 (DE) .......................... 10 2006 023 552

(51) Int. Cl.
*G01P 3/18* (2006.01)
*F16H 57/08* (2006.01)
(52) U.S. Cl. ............... 701/54; 701/51; 701/84; 475/331

(58) Field of Classification Search ............... 701/54, 701/51, 55, 84, 90; 475/331, 210, 5; 702/145; 74/745
See application file for complete search history.

(56) References Cited

U.S. PATENT DOCUMENTS

| 4,320,381 A | 3/1982 | Olivier |
| 4,817,470 A | 4/1989 | Müller et al. |
| 4,901,562 A | 2/1990 | Beakas et al. |
| 5,335,764 A | 8/1994 | Leitner et al. |
| 6,182,518 B1 | 2/2001 | Baur |
| 6,422,105 B1 | 7/2002 | Rose |
| 6,524,210 B1 * | 2/2003 | Vorndran ...................... 475/210 |
| 6,579,201 B2 * | 6/2003 | Bowen .............................. 475/5 |

(Continued)

FOREIGN PATENT DOCUMENTS

DE    1 911 488    2/1970

(Continued)

*Primary Examiner* — Tan Q Nguyen
(74) *Attorney, Agent, or Firm* — Davis & Bujold, P.L.L.C.

(57) ABSTRACT

The present invention relates to a method for determining the rotational speed of the main shaft (3) of a transmission in which the main shaft (3) is connected to an output shaft (4) via a shiftable planetary gear (17), whereby the main shaft (3) is connected in a rotationally fixed manner to the sun gear (18) and the output shaft (4) is connected in a rotationally fixed manner to the planet carrier (20). The steps of the method are picking up the rotational speed ($n_{Hohlrad}$) of the ring gear (22), picking up the rotational speed ($n_{Abtrieb}$) of the output shaft or the planet carrier (20), and computing the rotational speed ($n_{Hauptwelle}$) of the main shaft (3) from the rotational speed ($n_{Hohlrad}$) of the ring gear and the rotational speed ($n_{Abtrieb}$) of the output shaft or the planet carrier (20). The present invention further relates to a transmission having a rotational speed pickup device.

14 Claims, 2 Drawing Sheets

U.S. PATENT DOCUMENTS

2003/0052562 A1    3/2003  Antony et al.
2006/0162490 A1*   7/2006  Steen et al. .................... 74/745
2006/0225520 A1   10/2006  Heinzelmann
2008/0293542 A1*  11/2008  Alfredsson et al. ........... 477/125

FOREIGN PATENT DOCUMENTS

| | | |
|---|---|---|
| DE | 40 08 878 A1 | 10/1990 |
| DE | 41 13 128 A1 | 10/1992 |
| DE | 43 33 512 A1 | 4/1994 |
| DE | 197 03 488 A1 | 8/1998 |
| DE | 198 14 758 A1 | 10/1999 |
| DE | 101 45 947 C1 | 11/2002 |
| DE | 102 23 625 A1 | 12/2003 |
| DE | 103 47 494 A1 | 6/2005 |
| EP | 0 443 939 A1 | 8/1991 |
| GB | 1 241 095 | 7/1971 |
| JP | 2002-181142 | 6/2002 |
| WO | WO-2005/038421 A1 | 4/2005 |

* cited by examiner

METHOD FOR DETERMINING THE ROTATIONAL SPEED OF THE MAIN SHAFT OF A TRANSMISSION, AND TRANSMISSION COMPRISING A DEVICE FOR DETECTING ROTATIONAL SPEED

This application is a national stage completion of PCT/EP2007/054017 filed Apr. 25, 2007, which claims priority from German Application Serial No. 10 2006 023 552.5 filed May 19, 2006.

FIELD OF THE INVENTION

The present invention relates to a method for determining the rotational speed of the main shaft of a transmission in which the main shaft is connected to an output shaft, via a shiftable planetary gear, where the main shaft is connected in a rotationally fixed manner to the sun gear and the output shaft is connected in a rotationally fixed manner to the planet carrier. The present invention further relates to a transmission having a rotational speed pickup device.

BACKGROUND OF THE INVENTION

Transmissions, which have rotational speed pickup devices for generating a speed signal for a motor vehicle or the like, are known from the state of the art. These rotational speed pickup devices basically include a signal or rotational speed transmitter that is connected in a rotationally fixed manner with the corresponding transmission shaft to which a stationary rotational speed sensor is allocated in order to pick up the rotational speed at the rotational speed transmitter.

DE 198 14 758 A1 generally describes a device for recording the rotational speed of a shaft. The known device has a signal generator that is connected in a rotationally fixed manner to the shaft and configured in a manner of a toothed wheel, where the teeth of the toothed wheel each have a steep and a flat tooth flank. In addition, an analog Hall Effect sensor is provided, which picks up the rotational speed in the radial direction on the circumference of the toothed wheel, which is to say the teeth. Thanks to the varying flank gradients of the two tooth flanks, it is possible to determine the rotational speed and direction of rotation of the shaft using only one sensor and a constant update rate, even if the shaft is rotating at a very low rotational speed.

DE 103 47 494 A1 describes a similar arrangement, in which the torque on gear shafts is to be determined. For this purpose, the known device includes a gear shaft, on which a rotational speed sensing gear is arranged in a rotationally fixed manner, where the rotational speed sensing gear is, in turn, allocated with a stationary rotational speed sensor, which picks up the rotational speed in the radial direction on the circumference of the rotational speed sensing gear, which is to say on the teeth. This means that the teeth of the rotational speed sensing gear generate electric impulses upon passing the rotational speed sensor, which are fed to an appropriate evaluation unit.

A further rotational speed pickup device for a transmission of a motor vehicle is disclosed in DE 102 23 625 A1. In this rotational speed measuring device, which likewise includes a signal transmitter and a sensor, the signal transmitter is integrated in a dust protection cover for a driven shaft sealing ring. The dust protection cover is disposed outside the gearbox housing and connected in a rotationally fixed manner to the output side of the gearbox, while the sensor is attached to the outside of the housing and picks up the rotational speed in the radial direction on the circumference of the dust protection cover. The known rotational speed pickup device, however, provides no indication as to the rotational speed at which the main shaft rotates, since only the rotational speed of the output-side or output shaft is determined.

The rotational speed pickup devices, known from the state of the art, for determining the rotational speed of the main shaft of a transmission, have proven themselves, but are disadvantageous to the extent that the signal transmitter or rotational speed sensing gears increase the transmission weight, the transmission length and the transmission size. Thus there exists the possibility of picking up the rotational speed of the main shaft directly on the outer teeth of the main shaft. This would, however, once again necessitate providing long sensors or sensor holders, which are prone to vibrations and would put reliable determination of the rotational speed at risk. Furthermore, when it comes to main shafts with floating support and/or large axial play, the state of the art offers no sufficient solution. Thus it is not guaranteed in transmissions having such a main shaft that the rotational speed can be reliably picked up on the speed sensor.

The present invention is consequently based upon the objective of indicating a method for determining the rotational speed of a main shaft of a transmission which enables the simple and reliable determination of rotational speed, while overcoming the disadvantages mentioned above. In addition, the invention relates to a transmission having a rotational speed pickup device.

SUMMARY OF THE INVENTION

A method for determining the rotational speed of the main shaft of a transmission in which the main shaft is connected to an output shaft via a shiftable planetary gear, where the main shaft is connected in a rotationally fixed manner to the sun gear and the output shaft is connected in a rotationally fixed manner to the planet carrier. After furnishing such a transmission, the rotational speed of the ring gear of the planetary gear is picked up in one step of the method. The rotational speed of the output shaft or the planet carrier is picked up in a further step of the method. The latter is preferable with respect to the stronger radial extension of the planet carrier, since then only one sensor having a short length would be required. Then the rotational speed of the main shaft is computed from the rotational speed of the ring gear and the rotational speed of the output shaft or the planet carrier. This can occur based on the known gear ratio of the planetary gear.

With the method, the rotational speed of the main shaft is not picked up directly on the main shaft, but rather indirectly from known magnitudes of the planetary gear and the rotational speeds of the ring gear and output shaft or planet carrier. This has the advantage that no rotational speed sensor having a long design or even additional rotational speed sensing gear, must be provided on the main shaft to directly pick up the rotational speed. As a result, an increase in the weight, the length and the volume of the transmission is prevented. Furthermore, reliable rotational speed determination is ensured, even if a floatingly mounted main shaft having large axial play is used. The method enables a determination of the rotational speed of the main shaft of the transmission regardless of the shifting state of the planetary gear.

In order to be able to determine the absolute rotational speed and/or direction of rotation, in a preferred embodiment of the method, the steps of picking up the direction of rotation of the ring gear, picking up the direction of rotation of the output shaft or the planet carrier, and determining the direction of rotation of the main shaft are, furthermore, carried out based on the direction of rotation of the ring gear and the direction of rotation of the output shaft or the planet carrier.

In a further preferred embodiment of the method, the rotational speed of the main shaft is calculated based on the following equation:

$$n_{Hauptwelle} = (1-i_0) \times n_{Abtrieb} + i_0 \times n_{Hohlrad}$$

Here, $n_{Hauptwelle}$ denotes the rotational speed of the main shaft, $i_0$ the stationary transmission gear ratio of the planetary gear, $n_{Hohlrad}$ the rotational speed of the ring gear and $n_{Abtrieb}$ the rotational speed of the planet carrier or the output shaft. The directions of rotation thus ascertained are considered in the calculation in that they result in different algebraic signs of the rotational speeds. The planetary gear can be thus switched into a neutral shift state, in which both the planet carrier and the ring gear are released. The planet carrier or the output shaft and the ring gear are accordingly not braked fast. The rotational speed of the main shaft is determined based on the above equation. Furthermore, the planetary gear can be switched into a lower shifting state in which the ring gear is locked. Again, in order to calculate the rotational speed of the main shaft the equation mentioned above is used, where due to the locked ring gear ($n_{Hohlrad}=0$), it is simplified as follows:

$$n_{Hauptwelle} = (1-i_0) \times n_{Abtrieb}$$

Furthermore, the planetary gear can be switched into a high shift state in which the planetary gear rotates as a whole ($n_{Hauptwelle} = n_{Abtrieb} = n_{Hohlwelle}$). Again, the equation mentioned above for calculating the rotational speed of the main shaft is used which, during a rotation as a whole, is simplified to the following:

$$n_{Hauptwelle} = n_{Abtrieb}$$

In an advantageous embodiment of the method according to the invention, the gear ratio of the planetary gear is determined based on the equation, $$i_0 = -\frac{Z_{Hohlrad}}{Z_{Sonnenrad}}$$

where $Z_{Hohlrad}$ denotes the number of teeth on the ring gear and $Z_{Sonnenrad}$ the number of teeth on the sun gear.

The transmission has a main shaft, which is connected to an output shaft via a shiftable planetary gear. In this way, the planetary gear can be switched into a neutral, low or high state. The main shaft is connected in a rotationally fixed manner to the sun gear of the planetary gear, and the output shaft is connected in a rotationally fixed manner to the planet carrier of the planetary gear. The transmission can also be a range shift transmission. The transmission further comprises a rotational speed pickup device for determining the rotational speed of the main shaft. The rotational speed pickup device has a first rotational speed sensor on the ring gear for picking up the rotational speed of the ring gear and a second rotational speed sensor on the output shaft or the planet carrier for picking up the rotational speed of the output shaft or the planet carrier. The rotational speed sensor can be an induction sensor, a Hall effect sensor or the like, which interacts with a corresponding signal or rotational speed transmitter on the appropriate transmission part. In order to be able to calculate the rotational speed of the main shaft, the rotational speed pickup device furthermore has a computing unit, such that the rotational speed of the main shaft can be computed from the rotational speed of the ring gear and the rotational speed of the output shaft or the planet carrier. With respect to the advantages of the transmission, refer to the advantages of the method described above, which apply accordingly.

In order to minimize the transmission length in an advantageous embodiment of the transmission, the first and second rotational speed sensors are oriented such that the rotational speed of the ring gear and the rotational speed of the output shaft or the planet carrier can be picked up in the radial direction on the circumference. Since the ring gear and the planet carrier extend radially further to the outside than the main shaft and also the output shaft, in this configuration rotational speed sensors, having a particularly small design, may be used. In addition, no elongated holders for the rotational speed sensors are required.

In a further advantageous embodiment of the transmission, a signal transmitter, preferably in the form of an outer gearing, is provided each on the ring gear and on the output shaft or the planet carrier on which the corresponding rotational speed can be picked up.

In a particularly preferred embodiment of the transmission, the signal transmitter on the ring gear-side is configured as one piece with the ring gear and the other signal transmitter is configured as one piece with the output shaft or the planet carrier. For example, the signal transmitter can be embossed into the corresponding planetary gear part. In this way, the number of components is reduced, thus saving weight and simplifying the assembly.

In order to further simplify the design and assembly of the transmission, in a further preferred embodiment of the transmission, the first and second rotational speed sensors are disposed on a common sensor module. Thus, by attaching the sensor module inside the transmission, both rotational speed sensors can be installed at the same time.

In a further preferred embodiment of the transmission, the computing unit calculates the rotational speed of the main shaft based on the following equation:

$$n_{Hauptwelle} = (1-i_0) \times n_{Abtrieb} + i_0 \times n_{Hohlrad}.$$

With respect to the variables and constants mentioned in the equation, refer to the description of the method above. The computing unit thus calculates the rotational speed of the main shaft independently from the shift state of the planetary gear.

In a further preferred embodiment of the transmission, the computing unit determines the gear ratio of the planetary gear based on the following equation:

$$i_0 = -\frac{Z_{Hohlrad}}{Z_{Sonnenrad}}.$$

$Z_{Hohlrad}$ denotes the number of teeth on the ring gear and $Z_{Sonnenrad}$ the number of teeth on the sun gear.

In a further preferred embodiment of the transmission, a first rotational direction sensor is provided for picking up the direction of rotation of the ring gear and a second rotational direction sensor is provided for picking up the direction of rotation of the output shaft or the planet carrier, such that the direction of rotation of the main shaft can be determined by the computing unit based on the direction of rotation of the ring gear and the direction of rotation of the output shaft or the planet carrier. Moreover, the computing unit can determine the absolute rotational speed and/or the direction of rotation of the main shaft based on the two directions of rotation.

In order to keep the assembly expenditure particularly low, the first rotational speed sensor and the first rotational direction sensor are formed by a first combination sensor for picking up the rotational speed and the direction of rotation, while the second rotational speed sensor and the second rotational direction sensor are formed by a second combination sensor for picking up the rotational speed and the direction of rotation.

BRIEF DESCRIPTION OF THE DRAWINGS

The invention will now be described, by way of example, with reference to the accompanying drawings in which.

DETAILED DESCRIPTION OF THE INVENTION

Figure 1:
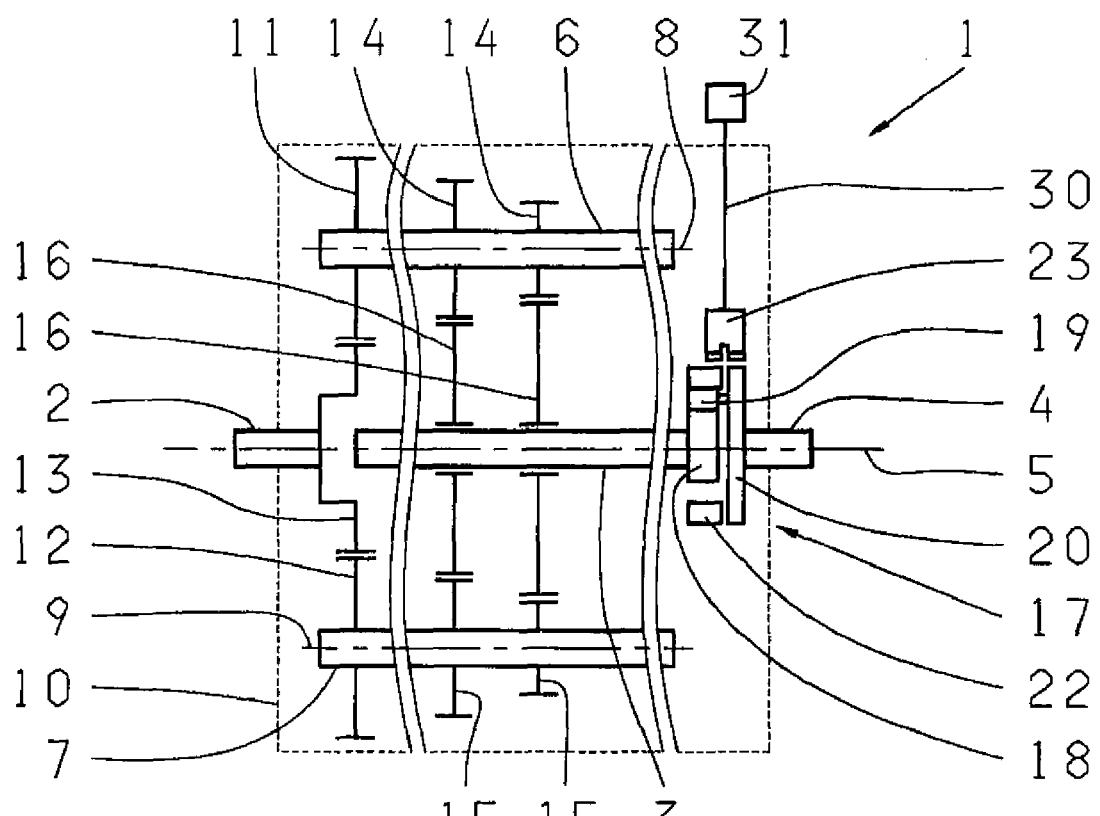
FIG. 1 is a schematic illustration of an embodiment of the transmission having a rotational speed pickup device and a planetary gear, according to the invention.

FIG. 1 is a schematic illustration of an embodiment of a transmission 1, which is operated based on the method. The transmission 1, which can be used in a motor vehicle, is a co-axial transmission comprising an input shaft 2, a main shaft 3 and an output shaft 4, which are disposed on an axle 5, one behind the other. Furthermore, two countershafts 6, 7 are provided, which extend along two axles 8, 9 disposed parallel to the axle 5. The main shaft 3 is floatingly supported between the two countershafts 6, 7 and with large axial play between the input shaft 2 and the output shaft 4. The transmission 1 furthermore comprises a transmission housing 10, through which the ends of the input and output shafts 2, 4, facing away from the main shaft 3, extend to the outside.

One input pinion 11, 12 is respectively attached on the countershafts 6, 7 which meshes with an output pinion 13 of the input shaft 2 so that the countershafts 6, 7 can be driven by the input shaft 2. In addition, further fixed gear wheels 14 or 15 are provided on the countershaft 6 or 7 which fixed gear wheels mesh with idler gear wheels 16 on the main shaft 3. The fixed gear wheels 14, 15, together with the corresponding idler gear wheel 16, form the gearset of a gear of the transmission 1. Moreover, in order to bring about a in a rotationally fixed manner connection or a coupling of the main shaft 3 to one of the idler gearwheels 16, at least one shiftable coupling device is provided on the main shaft 3, the illustration of which has been omitted for reasons of clarity.

Figure 2:
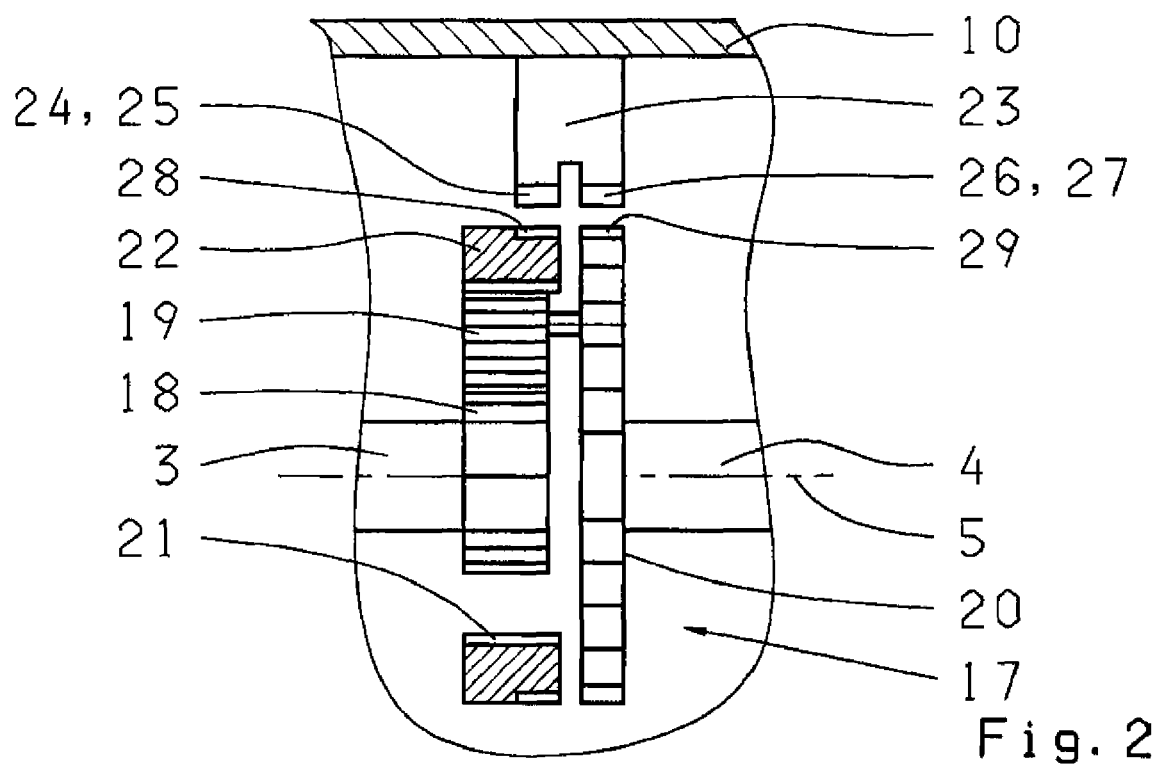
FIG. 2 is an enlarged illustration of the planetary gear according to FIG. 1.

The main shaft 3 is connected to the output shaft 4, via a shiftable planetary gear 17, which is shown in an enlarged illustration in FIG. 2. The planetary gear 17 comprises a sun gear 18, which is connected in a rotationally fixed manner to the main shaft 3. The sun gear 18 meshes with planet wheels 19 (of which only one is shown) which are rotatably disposed on a planet carrier 20. The planet carrier 20, in turn, is connected in a rotationally fixed manner to the output shaft 4. The planet wheels 19, in turn, mesh with the inner teeth 21 of a ring gear 22 of the planetary gear 17.

In addition, the transmission has a rotational speed pickup device for determining the rotational speed of the main shaft 3. The rotational speed pickup device has a stationary sensor module 23, which is disposed on the transmission housing 10. The sensor module 23 is provided with a first rotational speed sensor 24 for picking up the rotational speed of the ring gear 22 and a first rotational direction sensor 25 for picking up the direction of rotation of the ring gear 22, which are combined in a first combination sensor. In addition, a second rotational speed sensor 26 for picking up the rotational speed of the planet carrier 20, which corresponds to the rotational speed of the output shaft 4 and a second rotational direction sensor 27 for picking up the direction of rotation of the planet carrier 20 are provided, which are combined in a second combination sensor.

The first rotational speed/rotational direction sensor 24, 25 picks up the rotational speed and/or direction of rotation of the ring gear 22 in the radial direction on the circumference of the ring gear 22. For this purpose, a signal transmitter in the form of peripheral outer teeth 28 is provided on the circumference of the ring gear 22, configured in one piece with the ring gear 22. The second rotational speed/rotational direction sensor 26, 27 picks up the rotational speed and/or direction of rotation of the planet carrier 20 in the radial direction on the circumference of the planet carrier 20. Again, a signal transmitter in the form of peripheral outer teeth 29 is provided on the circumference of the planet carrier 20. The teeth rotating past the sensors 24, 25, 26, 27 generate the corresponding impulses in the sensors 24, 25, 26, 27 which allow a conclusion of the rotational speed and/or direction of rotation of the ring gear 22 and the planet carrier 20. In order to determine the corresponding direction of rotation the configuration described in DE 198 14 758 A1 can be used.

The sensors 24, 25, 26, 27 are connected to a computing unit 31 via a corresponding line 30. Based on the rotational speeds and directions of rotation determined for the ring gear 22 and planet carrier 20, the computing unit 31 can calculate the rotational speed and direction of rotation of the main shaft 3, as will be explained below with reference to FIG. 3.

The planetary gear 17 can be shifted into a neutral state, a low state or a high state. In the neutral state, both the planet carrier 17 and the ring gear 22 are released, which is to say they are not locked. In the low shift state, the ring gear is locked. In the high shift state, the planetary gear 17 rotates as a whole. Rotation as a whole is achieved by coupling a driven planetary gear part, such as the ring gear 22, to a second planetary gear part, such as the sun gear 18. The third planetary gear part, such as the planet carrier 20, is then forced to rotate along at the same rotational speed.

Figure 3:
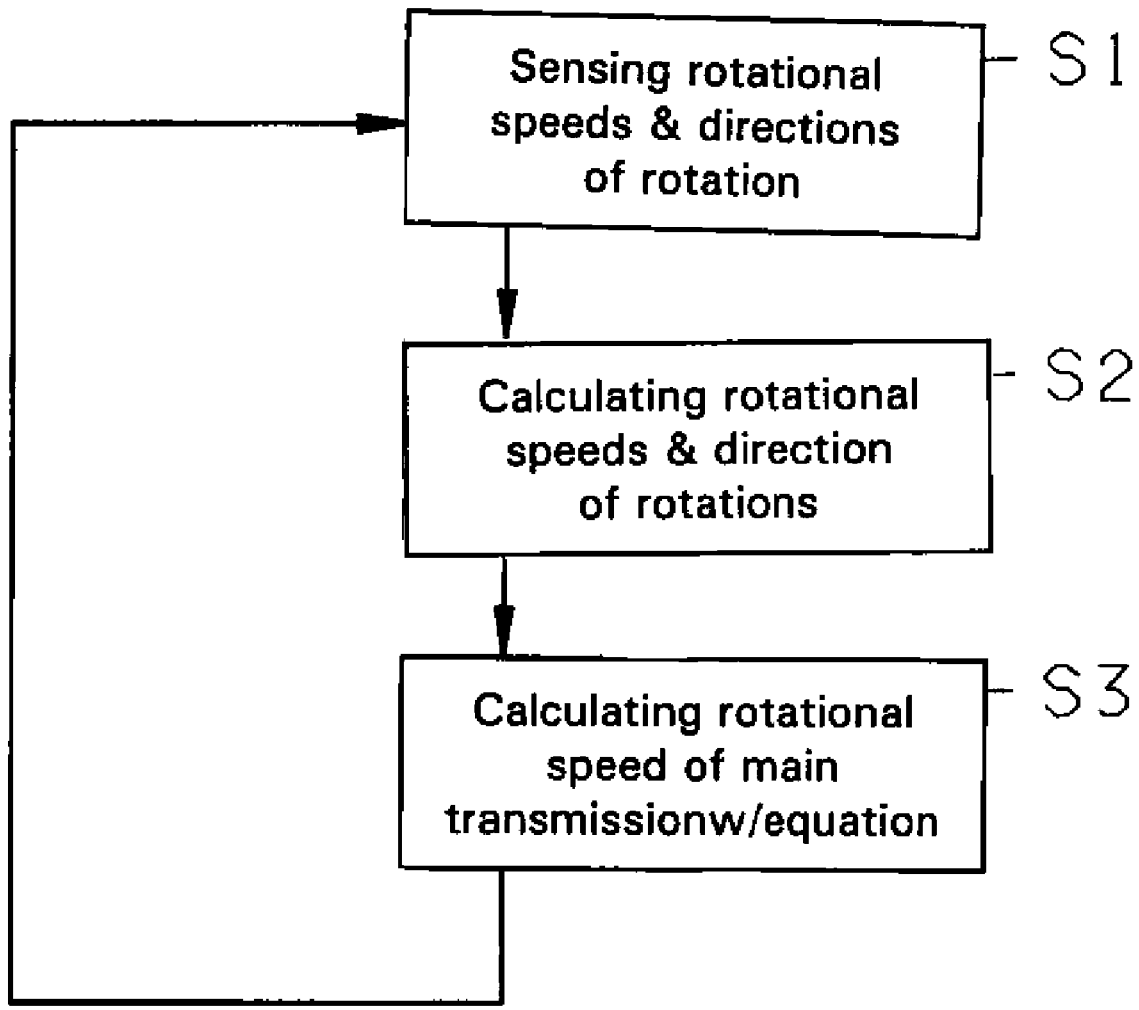
FIG. 3 is a flow chart to illustrate the underlying method according to the invention for the transmission according to FIGS. 1 and 2.

FIG. 3 shows the flow of the method, which is based on the transmission 1 described above. In a first step S1 of the method, the rotational speeds and directions of rotation of the ring gear 22 and the planet carrier 20 are picked up on the corresponding planetary gear part with the help of the rotational speed/rotational direction sensors 24, 25, 26, 27. The signals produced in the sensors 24, 25, 26, 27 are transmitted to the computing unit 31, via the line 30.

In a second step S2 of the method, the rotational speeds and directions of rotation of the ring gear 22 and the planet carrier 20 are calculated or determined based on the transmitted signals.

In a third step S3 of the method, the computing unit 31 calculates the rotational speed of the main shaft 3 based on the following equation:

$$n_{Hauptwelle} = (1-i_0) \times n_{Abtrieb} + i_0 \times n_{Hohlrad}.$$

Here, $n_{Hauptwelle}$ denotes the rotational speed of the main shaft 3, $n_{Hohlrad}$ the rotational speed of the ring gear 22, and $n_{Abtrieb}$ the rotational speed of the planet carrier 20. $i_0$ denotes the stationary transmission gear ratio of the planetary gear 17 and is computed as follows:

$$i_0 = -\frac{Z_{Hohlrad}}{Z_{Sonnenrad}}.$$

Here, $Z_{Hohlrad}$ denotes the number of the inner teeth 21 on the ring gear 22 and $Z_{Sonnenrad}$ the number of outer teeth on the sun gear 18.

Parallel to the above step S3 of the method, the direction of rotation of the main shaft 3 is also determined based on the directions of rotation of the ring gear 22 and planet carrier 20 in order to be able to determine the absolute rotational speed $n_{Hauptwelle}$ and the direction of rotation of the main shaft 3, using the equation mentioned at the beginning.

With the method, the rotational speed and direction of rotation of the main shaft is thus always determined based on the above equation, regardless of whether the planetary gear 17 is shifted into a neutral, low or high state.

REFERENCE NUMERALS

1 transmission
2 input shaft
3 main shaft
4 output shaft
5 axle
6 countershaft
7 countershaft
8 axle
9 axle
10 transmission housing
11 input pinion
12 input pinion
13 output pinion
14 fixed gear wheels
15 fixed gear wheels
16 idler gear wheels
17 planetary gear
18 sun gear
19 planet wheels
20 planet carrier
21 inner teeth
22 ring gear
23 sensor module
24 first rotational speed sensor (first combination sensor)
25 first rotational direction sensor (first combination sensor)
26 second rotational speed sensor (second combination sensor)
27 second rotational direction sensor (second combination sensor)
28 outer teeth
29 outer teeth
30 line
31 computing unit
$i_0$ stationary transmission gear ratio of the planetary gear
$n_{Abtrieb}$ rotational speed of the planetary gear
$n_{Hauptwelle}$ rotational speed of the main shaft
$n_{Hohlrad}$ rotational speed of the ring gear
S1-S3 steps of the method
$Z_{Hohlrad}$ number of inner teeth of the ring gear
$Z_{Sonnenrad}$ number of outer teeth of the sun gear

The invention claimed is:

1. A method for determining a rotational speed of a main shaft of a transmission, the main shaft being connected to an output shaft via a shiftable planetary gear, the main shaft being connected in a rotationally fixed manner to a sun gear and the output shaft being connected in a rotationally fixed manner to a planet carrier, the method comprising the steps of:
picking up the rotational speed ($n_{Hohlrad}$) of a ring gear,
picking up the rotational speed ($n_{Abtrieb}$) of one of the output shaft or the planet carrier, and
computing the rotational speed ($n_{Hauptwelle}$) of the main shaft from the rotational speed ($n_{Hohlrad}$) of the ring gear and the rotational speed ($n_{Abtrieb}$) of the one of the output shaft or the planet carrier.

2. The method according to claim 1, further comprising the step of picking up a direction of rotation of the ring gear, picking up a direction of rotation of the one of the output shaft or the planet carrier, and determining a direction of rotation of the main shaft based on the direction of rotation of the ring gear and the direction of rotation of the one of the output shaft or the planet carrier.

3. The method according to claim 1, further comprising the step of determining the rotational speed ($n_{Hauptwelle}$) of the main shaft based on the equation:

$$n_{Hauptwelle} = (1-i_0) \times n_{Aberieb} + i_0 \times n_{Hohlrad}$$

where, $i_0$ denotes the stationary transmission gear ratio of the planetary gear.

4. The method according to claim 3, further comprising the step of the stationary transmission gear ratio ($i_0$) of the planetary gear is determined based on the equation:

$$i_0 = -\frac{Z_{Hohlrad}}{Z_{Sonnenrad}}$$

where, $Z_{Hohlrad}$ is a number of teeth on the ring gear and $Z_{Sonnenrad}$ is a number of teeth on the sun gear.

5. A transmission comprising a main shaft (3) being connected to an output shaft (4) via a shiftable planetary gear (17), the main shaft (3) being connected to a sun gear (18) in a rotationally fixed manner and the output shaft (4) being connected to a planet carrier (20) of the planetary gear (17) in a rotationally fixed manner, and a rotational speed pickup device for determining a rotational speed ($n_{Hauptwelle}$) of the main shaft (3), having
a first rotational speed sensor (24) on a ring gear (22) for picking up a rotational speed ($n_{Hohlrad}$) of the ring gear (22),
a second rotational speed sensor (26) on one of the output shaft or the planet carrier (20) for picking up a rotational speed ($n_{Abtrieb}$) of the one of the output shaft or the planet carrier (20), and
a computing unit (31) from calculating the rotational speed ($n_{Hauptwelle}$) of the main shaft (3) from the rotational speed ($n_{Hohlrad}$) of the ring gear (22) and the rotational speed ($n_{Abtrieb}$) of the one of the output shaft or the planet carrier (20).

6. The transmission according to claim 5, wherein the first rotational speed sensor (24) and the second rotational speed sensor (26) are oriented such that the rotational speed ($n_{Hohlrad}$) of the ring gear (22) and the rotational speed ($n_{Abtrieb}$) of the one of the output shaft or the planet carrier (20) is picked up in a radial direction about a circumference.

7. The transmission according to claim 5, wherein the ring gear (22) and the one of the output shaft or the planet carrier (20) each have outer teeth (28, 29), which are respectively detectable by the first and the second rotational speed sensors (24, 26) for measuring the respective rotational speeds ($n_{Hohlrad}$, $n_{Abtrieb}$) of the ring gear (22) and the one of the output shaft or the planet carrier (20).

8. The transmission according to claim 7, wherein the teeth are configured as one piece with the respective ring gear (22) and the one of the output shaft or the planet carrier (20).

9. The transmission according to claim 5, wherein the first rotational speed sensor (24) and the second rotational speed sensor (26) are disposed on a common sensor module (23).

10. The transmission according to claim 5, wherein the rotational speed ($n_{Hauptwelle}$) of the main shaft (3) is calculated by a computing unit (31) according to the equation:

$$n_{Hauptwelle} = (1-i_0) \times n_{Abtrieb} + i_0 \times n_{Hohlrad}$$

with, $i_0$ denoting a stationary transmission gear ratio of the planetary gear (17).

11. The transmission according to claim 10, wherein the stationary transmission gear ratio ($i_0$) of the planetary gear (17) is determined by the computing unit (31) based on the equation:

$$i_0 = -\frac{Z_{Hohlrad}}{Z_{Sonnenrad}}$$

with, $Z_{Hohlrad}$ is the number of teeth on the ring gear (22) and $Z_{Sonnenrad}$ is the number of teeth on the sun gear (18).

12. The transmission according to claim 5, further comprising a first rotational direction sensor (25) for picking up a direction of rotation of the ring gear (22) and a second rotational direction sensor (27) for picking up the direction of rotation of the one of the output shaft or the planet carrier (20), the direction of rotation of the main shaft (3) is determined by the computing unit (31) based on the direction of rotation of the ring gear (22) and the direction of rotation of the one of the output shaft or the planet carrier (20).

13. The transmission according to claim 12, wherein at least one of the first and the second rotational speed sensors (24; 26) and at least one of the first and the second rotational direction sensors (25; 27) are at least a first and a second combination sensor for picking up the rotational speed and the direction of rotation.

14. A transmission assembly for determining rotational speed and rotational direction of a main shaft (3) and an output shaft (4) of a transmission (1), the assembly comprising:

a planetary gearset (17) having a sun gear (18), a ring gear (22) and a planet carrier (20) supporting planetary gears (19), the sun gear (18) being coupled to the main shaft (3) in a rotationally fixed manner, the planet carrier (20) being coupled to the output shaft (4) in a rotationally fixed manner;

the ring gear (22) having a plurality of exterior teeth (28) and the planet carrier (20) having a plurality of exterior teeth (29);

a sensor module (23) having
 a first rotational speed sensor (24) and a first rotational direction sensor (25) for detecting speed and rotational direction of the plurality of exterior teeth (28) of the ring gear (22), and
 a second rotational speed sensor (26) and a second rotational direction sensor (27) for detecting speed and rotational direction of the plurality of exterior teeth (29) of the planet carrier (20); and a computing unit (31) communicating with each of the first and the second rotational speed sensors (24, 26) and the first and the second rotational direction sensors (25, 27) for receiving signals therefrom and calculating the rotational speed and the rotational direction of the main shaft (3) and the output shaft (4).

\* \* \* \* \*